Sept. 11, 1928.

H. HERRMANN

POWER DRIVEN VEHICLE

Filed July 13, 1927

1,683,776

Inventor
Heinrich Herrmann
By Kingloogsoy
Atty

Patented Sept. 11, 1928.

1,683,776

UNITED STATES PATENT OFFICE.

HEINRICH HERRMANN, OF ESSEN, GERMANY, ASSIGNOR TO FRIED. KRUPP AKTIEN-GESELLSCHAFT, OF ESSEN-ON-THE-RUHR, GERMANY.

POWER-DRIVEN VEHICLE.

Application filed July 13, 1927, Serial No. 205,522, and in Germany July 14, 1926.

This invention relates to coolers for the engines of power-driven vehicles and has for its object to provide at least two fans for the cooler, one of which fans is directly driven by the engine or by a power transmitting member permanently connected to the engine, whilst the other fan is driven by another transmitting member permanently connected to the wheels of the vehicle.

Figure 1:
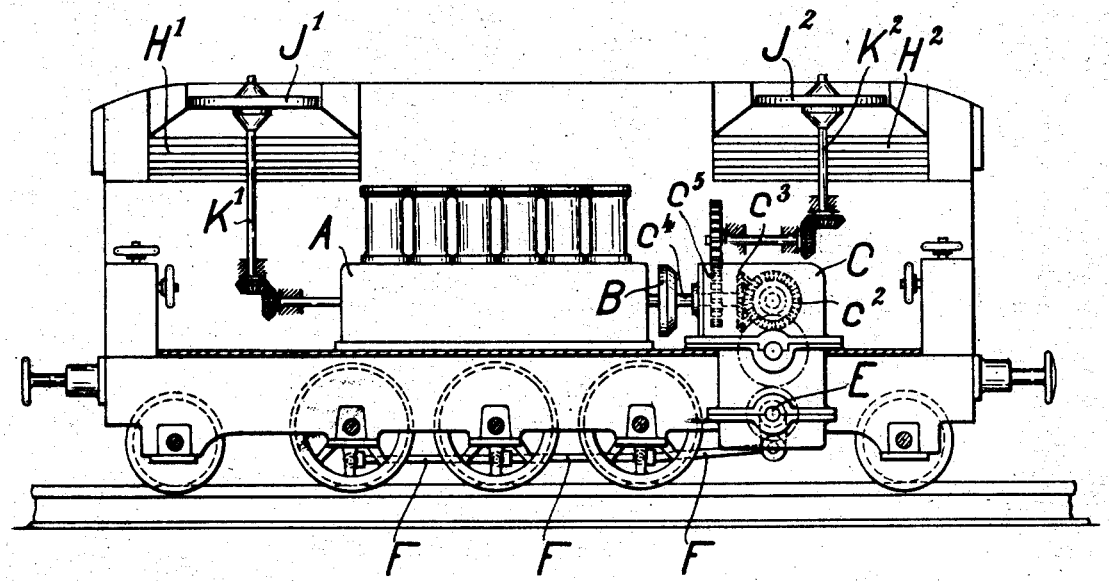
Figure 2:
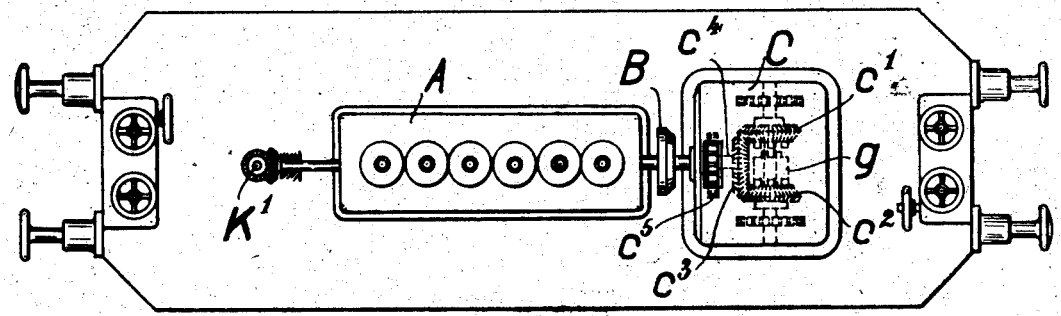

An embodiment of the subject-matter of the invention is diagrammatically illustrated in the accompanying drawing by way of example. The drawing shows the parts of the vehicle in question, Fig. 1 being a lateral view and Fig. 2 the corresponding top view thereof.

The vehicle is driven by a Diesel engine A, gearing C, being connected to the latter by means of a disengageable clutch B. The wheels of the vehicles are driven by the shaft E, on which the gearing is loosely mounted, through connecting rods F. The gearing C has two bevel wheels $c^1$ and $c^2$, Fig. 2, in mesh with a common bevel wheel $c^3$. The bevel wheels $c^1$, $c^2$ are loose on their shaft and may be coupled thereto by a clutch $g$ either for forward or backward running. The cooler intended to re-cool the cooling water of the Diesel engine consists of two nests of tubes $H^1$ and $H^2$, to which cooling air is supplied by fans $J^1$ and $J^2$, respectively. Fan $J^1$ is in connection with the engine shaft through the intermediary of a shafting $K^1$, whilst fan $J^2$ is driven from a spur wheel $c^5$ fast on gear shaft $c^4$, by means of a shafting $K^2$. Owing to the provision of the reverse gearing $c^1$ $c^2$ $c^3$, the engine shaft and gear shaft $c^4$ located between clutch B and bevel wheel $c^3$ permanently rotate in the same sense; consequently the fans $J^1$, $J^2$ rotate likewise in one and the same direction both with forward and backward running of the vehicle, so that a throw-over gear for the fans is rendered superfluous. The described arrangement affords the further advantage, that, when the clutch B is disengaged, at least one of the fans is always in operation for cooling purposes both when the vehicle is at rest and the engine is running idly, and when the engine is at rest and the vehicle is running downhill.

What I claim as my invention and desire to secure by Letters Patent, is:—

1. In a power-driven wheeled vehicle, an artificially cooled driving engine, a disengageable coupling between said engine and the driven axles of the vehicle, means for re-cooling the cooling agent used, said means comprising a plurality of fans, part of which is adapted to be driven from said engine and part to be driven from said axles of the vehicle.

2. In a power-driven wheeled vehicle, an artificially cooled driving engine, a disengageable coupling between said engine and the driven axles of the vehicle, means for re-cooling the cooling agent used, said means comprising two fans, one of them being adapted to be driven from said engine and the other to be driven from said axles of the vehicle.

3. In a power-driven wheeled vehicle, an artificially cooled driving engine, a transmission gearing interposed between said engine and the driven axles of the vehicle, a disengageable coupling arranged between the engine shaft and the shaft of said gearing, means for re-cooling the cooling agent used, said means comprising two fans, one of them being adapted to be driven from the engine shaft and the other to be driven from said axles through the intermediary of said gearing.

4. In a power-driven wheeled vehicle, an artificially cooled driving engine, a reverse gearing interposed between said engine and the driven axles of the vehicle, a disengageable coupling arranged between the engine shaft and said reverse gearing, means for re-cooling the cooling agent used, said means comprising two fans, one of them being coupled with the engine shaft and the other being coupled with a shaft, of said reverse gearing whose direction of rotation is constant.

5. In a Diesel locomotive, a Diesel engine, a reverse gearing interposed between the shaft of said engine and the driven axles of the locomotive, a disengageable coupling arranged between the engine shaft and said reverse gearing, a cooling arrangement for said engine, and means for re-cooling the cooling agent used, said means comprising a radiator for the cooling agent and a plurality of fans co-operating with said radiator, part of which is adapted to be driven from the shaft of said engine and part to be driven from a shaft of said reverse gearing whose direction of rotation is constant.

6. In a Diesel locomotive, a Diesel engine, a reverse gearing interposed between the shaft of said engine and the driven axles of the locomotive, a disengageable coupling arranged between the engine shaft and said reverse gearing, a cooling arrangement for said engine, and means for re-cooling the cooling agent used, said means comprising a radiator for the cooling agent and two fans co-operating with said radiator, one of them being coupled with the shaft of said engine and the other being coupled with a shaft of said reverse gearing whose direction of rotation is constant.

The foregoing specification signed at Cologne, Germany, this 21st day of June, 1927.

HEINRICH HERRMANN.